(12) United States Patent
James

(10) Patent No.: US 11,269,109 B2
(45) Date of Patent: Mar. 8, 2022

(54) MOVEABLE ANTENNA WITHIN A WELLBORE

(71) Applicant: Halliburton Energy Services, Inc., Houston, TX (US)

(72) Inventor: Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 11 days.

(21) Appl. No.: 16/788,509

(22) Filed: Feb. 12, 2020

(65) Prior Publication Data

US 2021/0247542 A1    Aug. 12, 2021

(51) Int. Cl.
*G01V 3/30* (2006.01)
*E21B 47/13* (2012.01)
*G01V 3/34* (2006.01)
*H01Q 1/04* (2006.01)
*H01Q 1/27* (2006.01)

(52) U.S. Cl.
CPC .............. *G01V 3/30* (2013.01); *E21B 47/13* (2020.05); *G01V 3/34* (2013.01); *H01Q 1/04* (2013.01); *H01Q 1/27* (2013.01)

(58) Field of Classification Search
None
See application file for complete search history.

(56) References Cited

U.S. PATENT DOCUMENTS

| | | |
|---|---|---|
| 2002/0092701 A1* | 7/2002 | Norris ................ G01V 1/40 181/102 |
| 2014/0218207 A1 | 8/2014 | Gano et al. |
| 2016/0145999 A1 | 5/2016 | Clarkson et al. |
| 2017/0138182 A1 | 5/2017 | Bogdan et al. |
| 2018/0066514 A1* | 3/2018 | Werkheiser ......... G01V 11/002 |
| 2019/0368290 A1 | 12/2019 | Vick et al. |

OTHER PUBLICATIONS

PCT Application No. PCT/US2020/017873, International Search Report and Written Opinion, dated Nov. 10, 2020, 12 pages.

* cited by examiner

*Primary Examiner* — Srilakshmi K Kumar
*Assistant Examiner* — Jerold B Murphy
(74) *Attorney, Agent, or Firm* — Kilpatrick Townsend & Stockton LLP

(57) ABSTRACT

A wellbore communication system includes a section of downhole tubing positionable within a wellbore and a track mechanically coupleable to the section of downhole tubing. The wellbore communication system also includes a downhole communication device and an actuator mechanically coupleable to the downhole communication device and the track. In operation, the actuator is able to move the downhole communication device along the track.

20 Claims, 5 Drawing Sheets

MOVEABLE ANTENNA WITHIN A WELLBORE

TECHNICAL FIELD

The present disclosure relates generally to an antenna system that can be moved within a wellbore and, more particularly (although not necessarily exclusively), to enhancing data or power transmission performance within the wellbore using the moveable antenna system.

BACKGROUND

A well (e.g., oil or gas well) may include a wellbore drilled through a subterranean formation. Transmitting and receiving antennas may be positioned within the wellbore to enable data communication and power transmission between (i) downhole tools within the wellbore and (ii) equipment at a surface of the wellbore. Antennas coupled to tools within the wellbore can link with antennas on completion tubing within the wellbore.

The signal strength between the antennas may be limited if the antennas are not positioned in close proximity to one another within the wellbore. Because the antennas may be located several thousand feet or meters below a surface of the wellbore, positioning the antennas at precise wellbore depths may be difficult. Techniques to increase precision when landing antennas relative to other antennas within the wellbore may result in increased signal strength and enhanced power transfer between the antennas.

DETAILED DESCRIPTION

Figure 1:
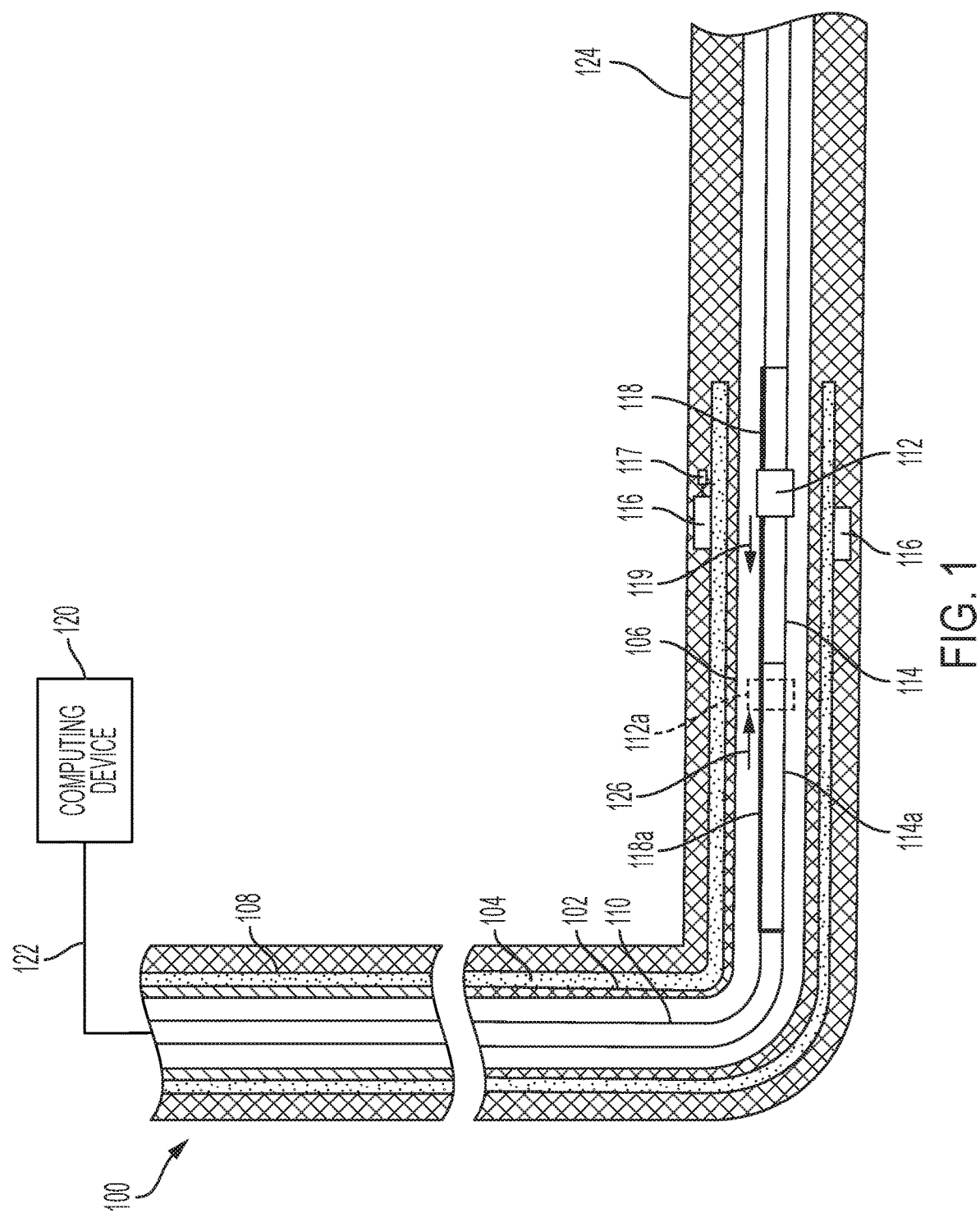
FIG. 1 is a cross-sectional view of a wellbore system according to one example of the present disclosure.

Certain aspects and examples of the present disclosure relate to an antenna that is movably positionable within a wellbore with respect to another antenna. In an example, the antenna may be an antenna including a linear actuator that is positioned on a linear track that is mechanically coupled to a section of tubing downhole within the wellbore. The linear actuator may enable the movement of the antenna along the linear track of the section of tubing. In some examples, the antenna is in wired or wireless communication with a computing system located at a surface of the wellbore. The other antenna may be an antenna that is located on casing installed within the wellbore. In some examples, the other antenna is communicatively coupled to a downhole tool or a downhole sensor positioned within the wellbore. In some examples, the casing-mounted antenna may be communicatively connected to the surface, and the tubing-mounted antenna may be communicatively coupled to the downhole tools.

A tubing-mounted antenna may be landed within the wellbore when tubing, such as production tubing, on which the tubing-mounted antenna is installed reaches a final position within the wellbore. By making the tubing-mounted antenna axially mobile with respect to the tubing (e.g., capable of being driven uphole or downhole within the wellbore), a relative positioning of the tubing-mounted antenna and the casing-mounted antenna may be fine-tuned. Fine tuning the relative positioning of the tubing-mounted antenna and the casing-mounted antenna may ensure that the tubing-mounted antenna and the casing-mounted antenna are aligned properly for maximum signal strength and power transfer efficiency.

Other inductive coupling tools may also be relatively positioned within a wellbore by fine tuning a depth of an inductive coupling tool within the wellbore. For example, an inductive coupling tool positioned on a section of tubing may be axially mobile with respect to the tubing such that the inductive coupling tool positioned on the tubing may gain communication with lateral wellbores or with gauges positioned outside of a screen. Thus, a landing window of the inductive coupling tool may be greatly expanded.

In an example, the tubing-mounted antenna or inductive coupling tool may be mechanically coupled to a linear actuator on an external surface of a section of tubing. The linear actuator may be an electrical linear actuator powered by a tubing encased conductor (TEC) or instrument wire (I-wire) from the surface or by a battery located within the wellbore. In some examples, a casing-mounted antenna may also be movable along the casing using a linear actuator if the casing-mounted antenna is not cemented in place or otherwise restrained.

By enabling axial mobility of the tubing-mounted antenna, inductive coupling tool, the casing-mounted antenna, or a combination thereof, reliability and signal fidelity of communications between downhole tools may be enhanced. Accordingly, the antennas or inductive coupling tools may be spaced out further and may be more compact as a landing window within the wellbore for the antennas and inductive coupling tools is able to be larger than for stationary antennas or inductive coupling tools.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a wellbore system 100 according to one example of the present disclosure. A wellbore 102 can extend through various earth strata. The wellbore 102 can extend through a hydrocarbon-bearing subterranean formation 124. The wellbore 102 can have a substantially vertical section 104 and a substantially horizontal section 106. The substantially vertical section 104 and the substantially horizontal section 106 can include a casing string 108 cemented at an upper segment of the substantially vertical section 104 and through a portion of the substantially horizontal section 106. A tubing string 110 can extend from the surface within wellbore 102. The tubing string 110 can provide a flow path between a portion of the wellbore 102 and the surface. In an example, the tubing string 110 is a string of production tubing.

A tubing-mounted antenna 112 can be included on a section 114 of the tubing string 110. The tubing-mounted antenna 112 can include a data transmission antenna that is able to transmit data to and receive data from a casing-mounted antenna 116. In an example, the tubing-mounted antenna 112 is a radio frequency (RF) antenna. The tubing-mounted antenna 112 may also be any other type of antenna. In another example, the tubing-mounted antenna 112 can include an inductive coupler that is able to inductively couple with another inductive coupler within the wellbore 102. For example, the tubing-mounted antenna 112 can inductively couple with another inductive coupler located at an entry to a lateral wellbore or with a gauge or other downhole instrument located outside of a downhole screen surrounding the tubing string 110 or cemented in the wellbore 102 with the casing string 108. In this manner, the tubing-mounted antenna 112 provides a mechanism for communication with or powering the lateral wellbore, downhole instruments and tools, or a combination thereof.

The tubing-mounted antenna 112 can be positioned in the wellbore 102 such that the tubing-mounted antenna 112 lands within a landing window from the casing-mounted antenna 116 (e.g., an RF antenna, an inductive coupler, or an acoustic transceiver) along the wellbore 102. The landing window may be half of a length of a track 118 mounted to the section 114 of the tubing string 110. In an example, the tubing-mounted antenna 112 may include a linear actuator (not shown) that is able to move the tubing-mounted antenna 112 linearly along the track 118 mounted to the section 114 of the tubing string 110. In some examples, the linear actuator may move the tubing-mounted antenna 112 along the tubing string 110 to position the tubing-mounted antenna 112 at an optimal communication position with the casing-mounted antenna 116. For example, the linear actuator may move the tubing-mounted antenna 112 in a direction 119 to align the tubing-mounted antenna 112 with the casing-mounted antenna 116. If the track 118 mounted to the section 114 of the tubing string 110 is 40 feet (i.e., about 13 meters) in length, then the landing window, which is a maximum distance of the tubing-mounted antenna 112 from the casing-mounted antenna 116 upon landing of the tubing string 110, is 20 feet (i.e., about 7 meters) to ensure that the tubing-mounted antenna 112 is able to align with the casing-mounted antenna 116.

In an example, the casing-mounted antenna 116 may be communicatively coupled to a downhole instrument 117, and the casing-mounted antenna 116 can transmit data from the downhole instrument 117 to the tubing-mounted antenna 112. The downhole instrument 117 may include pressure sensors, thermometers, or any other downhole condition monitoring tools. In an additional example, the casing-mounted antenna 116 may not be cemented in place along the casing 108. In such an example, the casing-mounted antenna 116 may include a linear actuator and a set of tracks to move the casing-mounted antenna 116 linearly along the casing. In such an example, the tubing-mounted antenna 112 may also include a linear actuator, as described above, or only the casing-mounted antenna 116 may include a linear actuator.

The tubing-mounted antenna 112 may be in communication with a computing device 120, which may be positioned at a surface of the wellbore 102, downhole within the wellbore 102, or the computing device 120 may be a distributed computing system including multiple, spatially separated computing components. Other equipment of the wellbore system 100 described may also be in communication with the computing device 120. In some examples, the computing device 120 that receives data from the tubing-mounted antenna 112 may be permanently installed surface equipment of the wellbore system 100. In additional examples, the computing device 120 may be positioned within a vehicle at the surface of the wellbore 102 as part of a mobile computing station. In other embodiments, the computing device 120 may be hand-held or remotely located from the well system 200.

The computing device 120 may be positioned below-ground, aboveground, onsite, in a vehicle, offsite, etc. The computing device 120 may include a processor interfaced with other hardware via a bus. A memory, which may include any suitable tangible (and non-transitory) computer-readable medium, such as RAM, ROM, EEPROM, or the like, can embody program components that configure operation of the computing device 120. In some aspects, the computing device 120 may include input/output interface components (e.g., a display, printer, keyboard, touch-sensitive surface, and mouse) and additional storage.

While FIG. 1 depicts the wellbore system 100 where the computing device 120 receives data from the tubing-mounted antenna 112 through a wired data connection 122, other communication schemes between the computing device 120 and the tubing-mounted antenna 112 may be used. For example, data signals transmitted to the computing device 120 may be acoustic signals, electromagnetic signals, mud-pulse telemetry signals, wired signals, or any other types of signals capable of providing the data received at the tubing-mounted antenna 112 to the computing device 120.

Further, while FIG. 1 depicts the wellbore 102 with the substantially vertical section 104 and the substantially horizontal section 106, the techniques described herein may also be used in wellbore systems that are substantially vertical for an entirety of the wellbore 102. Further, any other orientations of the wellbore 102 are also contemplated. For example, the substantially horizontal section 106 of the wellbore 102 may represent any wellbore 102 with a trajectory other than vertical (e.g., horizontal, inclined, etc.).

In an example, an additional tubing-mounted antenna 112a may be installed on a track 118a mounted to a section 114a of the tubing string 110. The tubing-mounted antenna 112a may include a linear actuator (not shown) that is able to move the tubing-mounted antenna 112a linearly along the track 118a. In some examples, the linear actuator may move the tubing-mounted antenna 112a along the tubing string 110 to position the tubing-mounted antenna 112a at an optimal communication position with the tubing-mounted antenna 112. That is, the tubing-mounted antenna 112a may move in a direction 126 and the tubing-mounted antenna 112 may move in the direction 119 such that the tubing-mounted antenna 112a and the tubing-mounted antenna 112 are able to efficiently and accurately transfer data, power, or both between one another.

Figure 2:
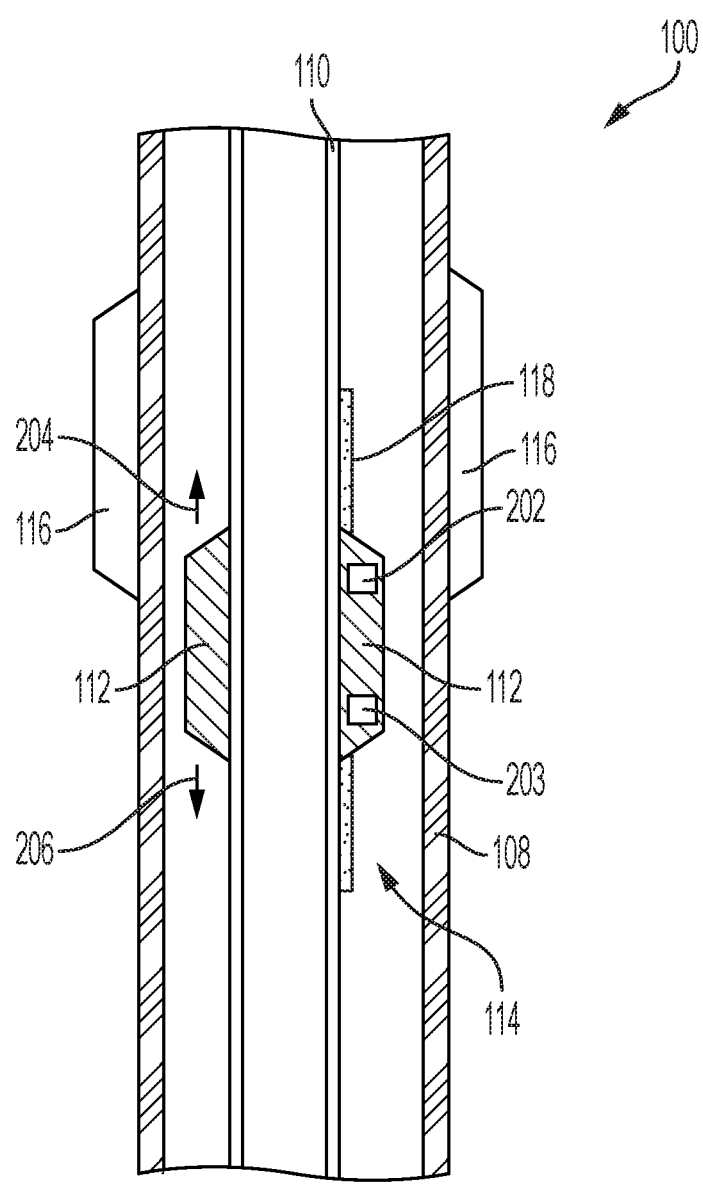
FIG. 2 is a cross-sectional view of a portion of the wellbore system of FIG. 1 including a tubing-mounted antenna and a casing-mounted antenna according to one example of the present disclosure.

FIG. 2 is a cross-sectional view of a portion of the wellbore system 100 including the tubing-mounted antenna 112 and the casing-mounted antenna 116 according to one example of the present disclosure. As described above with respect to FIG. 1, the tubing-mounted antenna 112 may be mounted to the section 114 of the tubing string 110 along with a linear actuator 202. The linear actuator 202 may interact with the track 118 mounted on the section 114 of the tubing string 110 to move the tubing-mounted antenna 112 in a linear direction 204 or an opposite linear direction 206. While the track 118 is depicted as covering only a portion of the section 114 of the tubing string 110, the track 118 may also cover an entire length of the section 114 of the tubing string 110. For example, the track may be up to 30 or 40 feet (i.e., about 10 or 13 meters) in length along the section 114 of the tubing string 110. Further, in some examples, the length of the track 118 may be three feet (i.e., about 1 meter) or shorter.

In the illustrated example, the tubing-mounted antenna 112 may be moved in the linear direction 204 such that the tubing-mounted antenna 112 is more closely aligned with the casing-mounted antenna 116, which is mounted on the casing string 108. By aligning the tubing-mounted antenna 112 with the casing-mounted antenna 112, accuracy and efficiency of data transfer between the tubing-mounted antenna 112 and the casing-mounted antenna 116 is enhanced. In another example, the tubing-mounted antenna 112 and the casing-mounted antenna 116 may be inductive couplers, and the inductive coupling between the two components may be established by moving the tubing-mounted antenna 112 into a position that aligns with the casing-mounted antenna 116. In an additional example, the tubing-mounted antenna 112 and the casing-mounted antenna 116 may be acoustic transceivers. In such an example, data transmission between the two components is performed using acoustic signals, and the tubing-mounted antenna 112 may be aligned with the casing-mounted antenna 116 for acoustic transmission of data, power, or both. The different types of tubing-mounted antennas 112 and casing-mounted antennas 116 (e.g., RF antennas, inductive couplers, and acoustic transceivers) may collectively be referred to as downhole communication devices.

Further, while the linear actuator 202 may be powered by a tubing encased conductor (TEC) or instrument wire (I-wire) that also provides control signals from the computing device 120, the linear actuator 202 may also receive power from a battery 203 positioned downhole with the linear actuator 202. For example, if the computing device 120 provides control signals to the linear actuator 202 wirelessly, the linear actuator 202 may receive power from the battery 203 in place of wired power. In other examples, as in FIG. 3, the battery 203 may not be present, and the linear actuator 202 may rely on power only from the TEC or I-wire. In an example, the linear actuator 202 may also be controlled or moved directly through a hydraulic system. The hydraulic system may be controlled by an in-well controller or through a supply from a hydraulic system located outside of the wellbore 102.

Figure 3:
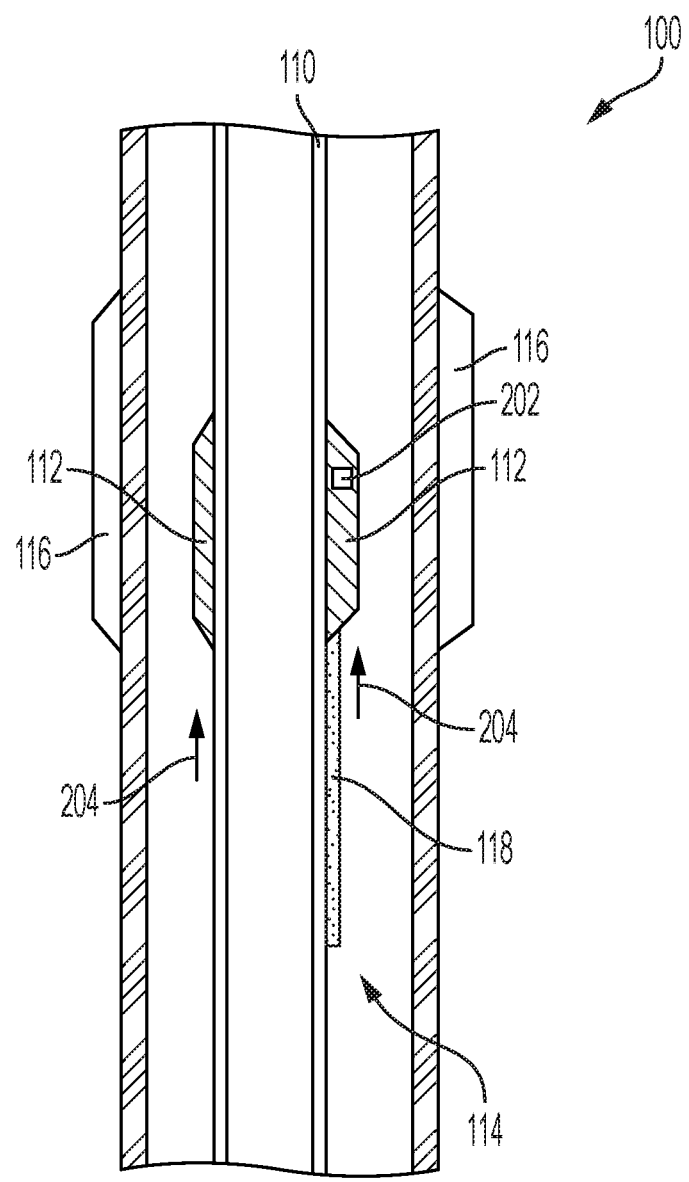
FIG. 3 is a cross-sectional view of the portion of the wellbore system of FIG. 2 upon repositioning the tubing-mounted antenna relative to the casing-mounted antenna according to one example of the present disclosure.

FIG. 3 is a cross-sectional view of a portion of the wellbore system 100 upon repositioning the tubing-mounted antenna 112 relative to the casing-mounted antenna 116 according to one example of the present disclosure. For example, the tubing-mounted antenna 112 may be moved in the linear direction 204 along the track 118 mounted on the section 114 of the tubing string 110 by the linear actuator 202. In the example illustrated by FIGS. 2 and 3, the tubing-mounted antenna 112 may be moved from a position that is misaligned with the casing-mounted antenna 116 (e.g., as in FIG. 2) to a position that is aligned with the casing-mounted antenna 116 (e.g., as in FIG. 3). By moving into alignment with the casing-mounted antenna 116, data transmission and power between the tubing-mounted antenna 112 and the casing-mounted antenna 116 is enhanced in relation to when the tubing-mounted antenna 112 and the casing-mounted antenna 116 are misaligned.

Figure 4:
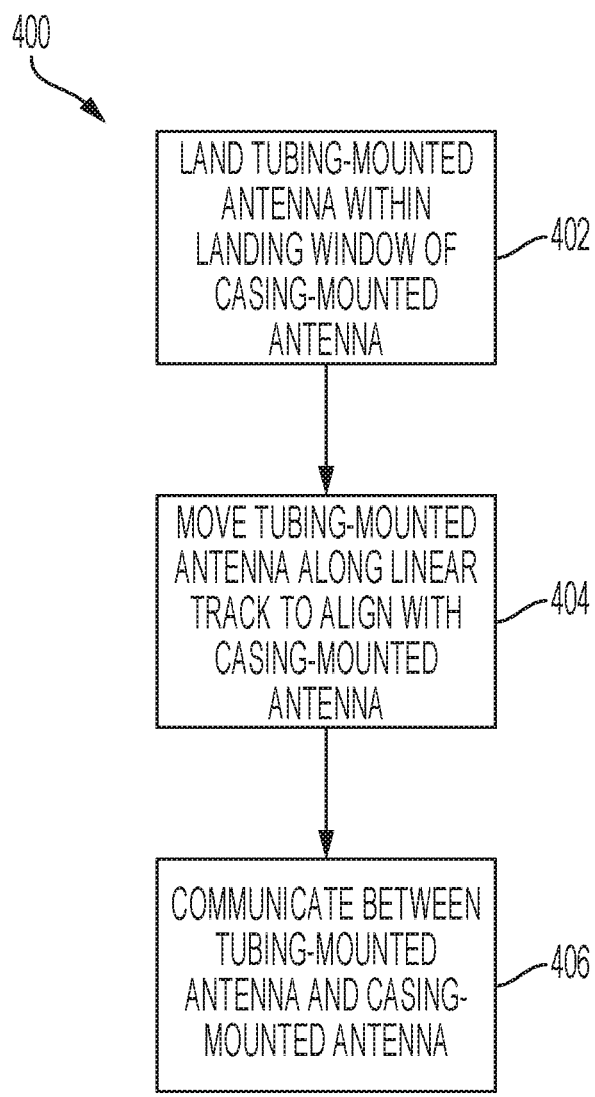
FIG. 4 is a flowchart of a process for installing the tubing-mounted antenna within a wellbore according to one example of the present disclosure.

FIG. 4 is a flowchart of a process 400 for installing the tubing-mounted antenna 112 within the wellbore 102 according to one example of the present disclosure. In an example, the process 400 may occur after the tubing string 110 is landed at a final position within the wellbore 102. For illustrative purposes, the process 400 is described with reference to certain examples depicted in the figures. Other implementations, however, are possible.

At block 402, the process 400 involves landing the tubing-mounted antenna 112 within a landing window of the casing-mounted antenna 116. As discussed above with respect to FIG. 1, the landing window may be one half of a length of the track 118 mounted on the section 114 of the tubing string 110. By landing the tubing-mounted antenna 112 within the landing window, the tubing-mounted antenna 112 is able to be repositioned by the linear actuator 202 along the track 118 to align with the casing-mounted antenna 116.

At block 404, the process 400 involves moving the tubing-mounted antenna along the track 118 to align the tubing-mounted antenna 112 with the casing-mounted antenna 116. By aligning the tubing-mounted antenna 112 with the casing-mounted antenna 116, the transmission of data, power, or both between the tubing-mounted antenna 112 and the casing-mounted antenna 116 may be enhanced in relation to when the tubing-mounted antenna 112 and the casing-mounted antenna 116 are misaligned.

At block 406, the process 400 involves communicating between the tubing-mounted antenna 112 and the casing-mounted antenna 116. Because the tubing-mounted antenna 112 is aligned with the casing-mounted antenna 116 at block 404, the reliability and signal fidelity of the data communication between the tubing-mounted antenna 112 and the casing-mounted antenna 116 may be enhanced.

Figure 5:
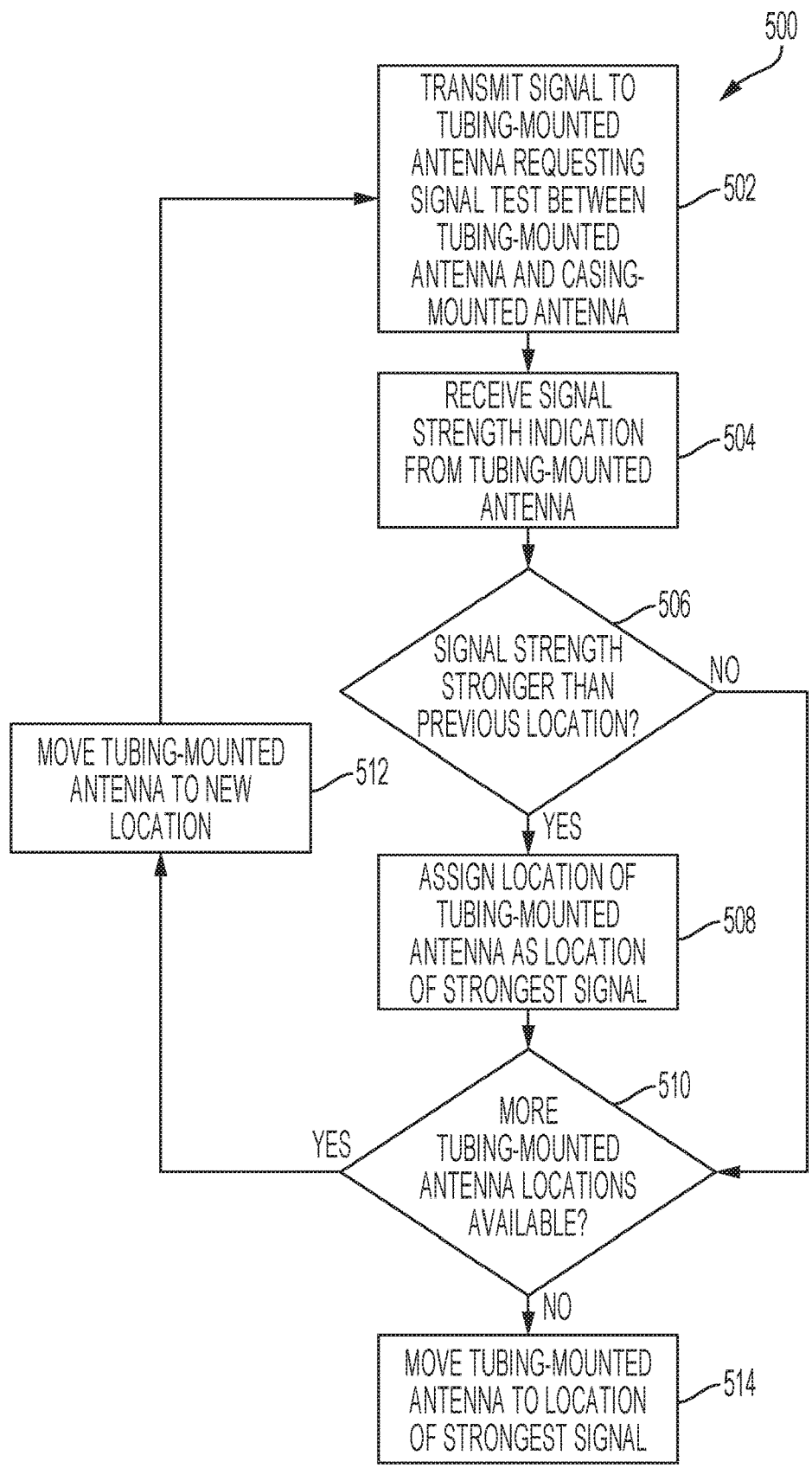
FIG. 5 is a flowchart of a process for positioning a tubing-mounted antenna within a wellbore according to one example of the present disclosure.

FIG. 5 is a flowchart of a process 500 for positioning the tubing-mounted antenna 112 within the wellbore 102, as at block 404 of FIG. 4, according to one example of the present disclosure. In an example, the process 500 may occur after the tubing string 110 is landed at a final position within the wellbore 102. For illustrative purposes, the process 500 is described with reference to certain examples depicted in the figures. Other implementations, however, are possible.

At block 502, the process 500 involves transmitting, by the computing device 120, a signal to the tubing-mounted antenna 112 requesting a signal test between the tubing-mounted antenna 112 and the casing-mounted antenna 116. As discussed above, the signal strength between the tubing-mounted antenna 112 and the casing-mounted antenna 116 may be poor when the tubing-mounted antenna 112 and the casing-mounted antenna 116 are misaligned. Accordingly, the signal test may provide a mechanism for the tubing-mounted antenna 112 to measure a signal strength from the casing-mounted antenna 116, for the casing-mounted antenna 116 to measure a signal strength from the tubing-mounted antenna 112, or both.

At block 504, the process 500 involves receiving, at the computing device 120, a signal strength indication from the tubing-mounted antenna 112 based on the signal test. The signal strength indication may provide the computing device 120 with an indication of the misalignment between the tubing-mounted antenna 112 and the casing-mounted antenna 116. For example, a very low signal strength indicates a greater misalignment than a relatively higher signal strength.

At block 506, the process 500 involves determining if the signal strength indication is stronger than at a previous location of the tubing-mounted antenna 112. In an example, the tubing-mounted antenna 112 may be positioned within the wellbore 102 at one end of the track 118, and the process 500 may be repeated when the tubing-mounted antenna 112 is positioned at set locations along a length of the track 118.

In this manner, each location of the tubing-mounted antenna 112 may generate a signal strength that is stronger than or weaker than a signal strength generated at one or more of the other locations along the length of the track 118. If the signal strength is stronger than a signal strength at a previous location of the tubing-mounted antenna 112, then the process 500 moves on to block 508. If the signal strength is not stronger than the signal strength at the previous location, then the process 500 bypasses block 508 and moves to block 510.

In some examples, block 506 may be replaced by making a determination as to whether the signal strength exceeds a threshold value. In such an example, if a threshold signal strength value is reached, the process 500 may end and the tubing-mounted antenna 112 may remain at the current location along the track 118. If the threshold signal strength value is not reached, the process 500 may proceed directly to block 512, as described below.

At block 508, the process 500 involves assigning the present location of the tubing-mounted antenna 112 as the location of the strongest signal. This assignment ensures that the tubing-mounted antenna 112 will return to the present location if no other locations available to the tubing-mounted antenna 112 can produce stronger signal strengths.

At block 510, the process 500 involves determining if more locations are available along the track 118 where the tubing-mounted antenna 112 has not moved. This determination may be made to ensure that the tubing-mounted antenna 112 has tested signal strengths at every available location along the track 118. If more locations are available, then the process 500 proceeds to block 512. If more locations are not available, then the process 500 proceeds to block 414.

At block 512, the process 500 involves moving the tubing-mounted antenna 112 to a new location along the track 118. When the tubing-mounted antenna 112 reaches the new location, the process 500 may begin again at block 502. At block 414, the process 500 involves moving the tubing-mounted antenna 112 to the location of the strongest signal (e.g., as assigned at block 508), and the process 500 ends. This ensures that the best available alignment for communication between the tubing-mounted antenna 112 and the casing-mounted antenna 116 is reached. The process 500 may also be repeated dynamically during downtime of the wellbore system 100. For example, when data is not being collected and transmitted between the casing-mounted antenna 116 and the tubing-mounted antenna 112, the location of the tubing-mounted antenna 112 may be adjusted by repeating the process 500 to ensure that the tubing-mounted antenna remains in an aligned position with the casing-mounted antenna 116.

In some aspects, a system and method for aligning downhole communication devices are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a wellbore communication system, comprising: a section of downhole tubing positionable within a wellbore; a track mechanically coupleable to the section of downhole tubing; a downhole communication device; and an actuator mechanically coupleable to the downhole communication device and the track to move the downhole communication device along the track.

Example 2 is the wellbore communication system of example 1, further comprising: an outer tubing in which the section of downhole tubing is positionable; and an additional downhole communication device mechanically coupleable to the outer tubing, wherein the actuator is positionable to move the downhole communication device along the track to align the downhole communication device with the additional downhole communication device to facilitate transmission of data, power, or both between the downhole communication device and the additional downhole communication device.

Example 3 is the wellbore communication system of examples 1-2, further comprising: an additional section of downhole tubing positionable within the wellbore and coupleable to the section of downhole tubing; and an additional downhole communication device coupleable to the additional section of downhole tubing, wherein the actuator is positionable to move the downhole communication device along the track to align the downhole communication device with the additional downhole communication device to facilitate transmission of data, power, or both between the downhole communication device and the additional downhole communication device.

Example 4 is the wellbore communication system of examples 1-3, further comprising a tubing encased conductor or an instrument wire coupleable between a surface of the wellbore and the actuator to provide a control signal to control the actuator to move the downhole communication device along the track.

Example 5 is the wellbore communication system of examples 1-4, wherein a length of the track is about 13 meters or less.

Example 6 is the wellbore communication system of examples 1-5, wherein the downhole communication device is moveable along the track to align the downhole communication device with a casing-mounted communication device.

Example 7 is the wellbore communication system of examples 1-6, wherein the section of downhole tubing is mechanically coupleable on either end to sections of production tubing.

Example 8 is the wellbore communication system of examples 1-7, wherein the downhole communication device is positionable within the wellbore to inductively couple with an inductive coupler located at an entry to a lateral wellbore from the wellbore or with a downhole instrument positionable within the wellbore.

Example 9 is the wellbore communication system of example 8, wherein the downhole communication device is positionable for being inductively coupled with (i) the inductive coupler or (ii) the downhole instrument, to transfer power and data signals between the downhole communication device and the inductive coupler.

Example 10 is a method, comprising: positioning a tubing-mounted communication device within a landing window of a casing-mounted communication device that is located within a wellbore; and moving the tubing-mounted communication device, using an actuator, along a track that is mechanically coupled to a section of tubing within the wellbore to align the tubing-mounted communication device with the casing-mounted communication device.

Example 11 is the method of example 10, wherein moving the tubing-mounted communication device comprises: performing a first signal strength test between the tubing-mounted communication device at a first location within the wellbore and the casing-mounted communication device to generate a first signal strength indication; moving the tubing-mounted communication device along the track using the actuator to a second location within the wellbore;

performing a second signal strength test between the tubing-mounted communication device positioned at the second location and the casing-mounted communication device to generate a second signal strength indication; moving the tubing-mounted communication device along the track to the first location within the wellbore using the actuator of the tubing-mounted communication device when the first signal strength indication is greater than the second signal strength indication; and maintaining the tubing-mounted communication device at the second location within the wellbore when the second signal strength indication is greater than the first signal strength indication.

Example 12 is the method of example 11, further comprising: moving the tubing-mounted communication device along the track using the actuator of the tubing-mounted communication device to a third location within the wellbore; performing a third signal strength test between the tubing-mounted communication device at the third location within the wellbore and the casing-mounted communication device to generate a third signal strength indication; moving the tubing-mounted communication device along the track to the first location within the wellbore using the actuator of the tubing-mounted communication device when the first signal strength indication is greater than the second signal strength indication and the third signal strength indication; moving the tubing-mounted communication device along the track to the second location when the second signal strength indication is greater than the first signal strength indication and the third signal strength indication; and maintaining the tubing-mounted communication device at the third location within the wellbore when the third signal strength indication is greater than the first signal strength indication and the second signal strength indication.

Example 13 is the method of examples 10-12, wherein the tubing-mounted communication device and the casing-mounted communication device comprise radio frequency antennas or acoustic transceivers.

Example 14 is the method of examples 10-13, wherein a length of the track is about 13 meters or less.

Example 15 is an apparatus comprising: a section of downhole tubing positionable within an outer tubing in a wellbore; and a track mechanically coupled to the section of downhole tubing and mechanically coupleable to an actuator of a downhole communication device to move the downhole communication device along the track to align the downhole communication device with an additional downhole communication device.

Example 16 is the apparatus of example 15, wherein the section of downhole tubing and the track are positionable within a casing tubing, and wherein the additional downhole communication device is mechanically coupleable to the casing tubing.

Example 17 is the apparatus of examples 15-16, wherein a length of the track is about 13 meters or less.

Example 18 is the apparatus of examples 15-17, wherein the section of downhole tubing is mechanically coupleable on either end to sections of production tubing.

Example 19 is the apparatus of examples 15-18, further comprising: a tubing encased coupler or an instrument wire communicatively coupleable to the actuator of the downhole communication device to provide power and control signals to the actuator.

Example 20 is the apparatus of examples 15-19, wherein the downhole communication device is moveable along the track to align the downhole communication device with the additional downhole communication device to inductively couple the downhole communication device with the additional downhole communication device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A wellbore communication system, comprising:
   a section of downhole tubing positionable within a wellbore;
   a track mechanically coupleable to the section of downhole tubing;
   a first downhole communication device comprising a first antenna;
   a second downhole communication device comprising a second antenna; and
   an actuator mechanically coupleable to the first downhole communication device, wherein the actuator is configured receive one or more control signals and responsively move the first downhole communication device along the track to create a spatial alignment between the first antenna and the second antenna for facilitating wireless transmission of data or power between the first antenna and the second antenna.

2. The wellbore communication system of claim 1, further comprising:
   an outer tubing in which the section of downhole tubing is positionable, wherein the second downhole communication device is mechanically coupleable to the outer tubing.

3. The wellbore communication system of claim 1, further comprising:
   an additional section of downhole tubing positionable within the wellbore and coupleable to the section of downhole tubing, wherein the second downhole communication device is coupleable to the additional section of downhole tubing.

4. The wellbore communication system of claim 1, further comprising a tubing encased conductor or an instrument wire coupleable between a surface of the wellbore and the actuator to provide the one or more control signals to control the actuator to move the first downhole communication device along the track.

5. The wellbore communication system of claim 1, wherein the wireless transmission comprises electromagnetic communication.

6. The wellbore communication system of claim 1, wherein the second downhole communication device is a casing-mounted communication device.

7. The wellbore communication system of claim 1, wherein the section of downhole tubing is mechanically coupleable on either end to sections of production tubing.

8. The wellbore communication system of claim 1, wherein the first downhole communication device is positionable within the wellbore to inductively couple with an inductive coupler located at an entry to a lateral wellbore from the wellbore or with a downhole instrument positionable within the wellbore.

9. The wellbore communication system of claim 8, wherein the first downhole communication device is positionable for being inductively coupled with (i) the inductive coupler or (ii) the downhole instrument, to transfer power and data signals between the first downhole communication device and the inductive coupler.

10. A method, comprising:
- positioning a tubing-mounted communication device including a first antenna within a landing window of a casing-mounted communication device including a second antenna that is located within a wellbore; and
- spatially aligning the first antenna with the second antenna by moving, using an actuator, the tubing-mounted communication device along a track that is mechanically coupled to a section of tubing within the wellbore to facilitate wireless transmission of data or power between the first antenna and the second antenna.

11. The method of claim 10, wherein moving the tubing-mounted communication device comprises:
- performing a first signal strength test between the tubing-mounted communication device at a first location within the wellbore and the casing-mounted communication device to generate a first signal strength indication;
- moving the tubing-mounted communication device along the track using the actuator to a second location within the wellbore;
- performing a second signal strength test between the tubing-mounted communication device positioned at the second location and the casing-mounted communication device to generate a second signal strength indication;
- moving the tubing-mounted communication device along the track to the first location within the wellbore using the actuator of the tubing-mounted communication device when the first signal strength indication is greater than the second signal strength indication; and
- maintaining the tubing-mounted communication device at the second location within the wellbore when the second signal strength indication is greater than the first signal strength indication.

12. The method of claim 11, further comprising:
- moving the tubing-mounted communication device along the track using the actuator of the tubing-mounted communication device to a third location within the wellbore;
- performing a third signal strength test between the tubing-mounted communication device at the third location within the wellbore and the casing-mounted communication device to generate a third signal strength indication;
- moving the tubing-mounted communication device along the track to the first location within the wellbore using the actuator of the tubing-mounted communication device when the first signal strength indication is greater than the second signal strength indication and the third signal strength indication;
- moving the tubing-mounted communication device along the track to the second location when the second signal strength indication is greater than the first signal strength indication and the third signal strength indication; and
- maintaining the tubing-mounted communication device at the third location within the wellbore when the third signal strength indication is greater than the first signal strength indication and the second signal strength indication.

13. The method of claim 10, wherein the tubing-mounted communication device and the casing-mounted communication device comprise radio frequency antennas or acoustic transceivers.

14. The method of claim 10, wherein the wireless transmission comprises electromagnetic communication.

15. A system comprising:
- a section of downhole tubing positionable within an outer tubing in a wellbore;
- a track mechanically coupled to the section of downhole tubing; and
- a first downhole communication device comprising a first antenna, the first downhole communication device being configured to move along the track for spatially aligning the first antenna with a second antenna of a second downhole communication device to facilitate wireless transmission of data or power between the first antenna in the first downhole communication device and the second antenna in the second downhole communication device.

16. The system of claim 15, wherein the section of downhole tubing and the track are positionable within a casing tubing, and wherein the second downhole communication device is mechanically coupleable to the casing tubing.

17. The system of claim 15, wherein the wireless transmission comprises electromagnetic communication.

18. The system of claim 15, wherein the section of downhole tubing is mechanically coupleable on either end to sections of production tubing.

19. The system of claim 15, further comprising:
- an actuator mechanically coupled to the first downhole communication device; and
- a tubing encased conductor or an instrument wire communicatively coupleable to the actuator of the first downhole communication device to provide power and control signals to the actuator, the actuator being operable to receive the control signals and responsively move the first downhole communication device along the track to spatially align the first antenna with the second antenna.

20. The system of claim 15, wherein the first downhole communication device is moveable along the track to align the first downhole communication device with the second downhole communication device to inductively couple the first downhole communication device with the second downhole communication device.

* * * * *